United States Patent [19]

Okamoto et al.

[11] Patent Number: 5,625,461
[45] Date of Patent: Apr. 29, 1997

[54] RECORDING AND REPRODUCING APPARATUS

[75] Inventors: Keishi Okamoto, Kadoma; Tatsushi Bannai, Sakai, both of Japan

[73] Assignee: Matsushita Electric Industrial Co., Ltd., Osaka, Japan

[21] Appl. No.: 255,804

[22] Filed: Jun. 7, 1994

Related U.S. Application Data

[63] Continuation of Ser. No. 980,561, Nov. 23, 1992, abandoned.

[30] Foreign Application Priority Data

Nov. 22, 1991  [JP]  Japan ................... 3-307392

[51] Int. Cl.$^6$ .................... H04N 5/76; G11B 27/02; G11B 5/02
[52] U.S. Cl. .................... 386/53; 358/343; 360/14.2; 360/27; 386/57; 386/93; 386/95; 386/96
[58] Field of Search ................. 358/315, 316, 358/317, 318, 335, 341, 342, 343; 360/33.1, 35.1; H04N 5/76, 5/78, 5/92, 5/91, 9/79, 9/70

[56] References Cited

U.S. PATENT DOCUMENTS

| 4,459,613 | 7/1984 | Faroudja ................... 358/318 |
| 4,480,273 | 10/1984 | Fujiki et al. ................... 358/341 |
| 4,700,239 | 10/1987 | Yoshinaka et al. ................... 358/318 |
| 4,752,832 | 6/1988 | Higurashi ................... 358/341 |
| 5,132,807 | 7/1992 | Takimoto et al. ................... 358/341 |
| 5,173,813 | 12/1992 | Haikawa et al. ................... 360/14.1 |

FOREIGN PATENT DOCUMENTS

| 60-223007 | 11/1985 | Japan . |
| 1-152877 | 6/1989 | Japan . |
| 1152877 | 6/1989 | Japan . |
| 2-76102 | 3/1990 | Japan . |

OTHER PUBLICATIONS

Sony, basic video recording course, booklet 4, pp. 1–11, 1979.

*Primary Examiner*—Thai Q. Tran
*Attorney, Agent, or Firm*—Wenderoth, Lind & Ponack

[57] ABSTRACT

A recording and reproducing apparatus is capable of editing video signals and audio signals recording additional information data for controlling the reproduction output level. The recording side includes an additional information data generating circuit, a time division multiplexing circuit for time-division multiplexing a video signal data and audio signal data and the additional information data, and a recording head. In independent areas on a recording medium, the video signal data, audio signal data and additional information data are individually recorded. The reproduction side includes a reproduction head, a data separation circuit for separating the video, audio and additional information, an additional information data detecting circuit for producing output level data, and a circuit for controlling the levels of the reproduced video and audio signals depending on the output level data.

1 Claim, 8 Drawing Sheets

RECORDING AND REPRODUCING APPARATUS

This application is a continuation of now abandoned application, Ser. No. 07/980,561, filed Nov. 23, 1992.

BACKGROUND OF THE INVENTION

1. Field of the invention

The present invention relates to a video signal recording and reproducing apparatus for recording and reproducing video and audio signal, and more particularly to a video signal recording and reproducing apparatus suited for editing the video signal or audio signal or both.

2. Description of the Prior Art

The video tape recorder (VTR, hereinafter) having an editing function accompanying operational processing of a recorded signal in desired such as, for example, fading-in and fading-out of the video signal or audio signal. To realize such an editing function, a method is known that reproduces a recorded signal, carries out specified signal processing of the reproduced signal, and records the processed signal in the area where the reproduced signal has been recorded on the recording medium. For example, in the recording and reproducing apparatus disclosed in Japanese Laid-Open Patent Application No. 60-223007 or No. 2-76102, in order to reproduce a track located a specific time in advance of the track traced by a recording head (prior reproduction), a prior reproduction head is disposed in addition to the recording head on a rotary cylinder.

In a conventional constitution, editing of a digitally recorded signal accompanying the operational processing, such as fade-in and fade-out, requires reproduction signal processing such as error detection and correction of the reproduced data prior to recording, the above-mentioned operational processing, and recording signal processing such as error correction code addition to the signal after the operational processing. Further, if the recorded signal is compression coded video signal or audio signal, decoding of the reproduction signal and compression coding of the signal after the operational processing are required.

These additional signal processings are complicated and increase the hardware scale. Further, the quantity of data to be reproduced by the prior reproduction must be increased with the increase of the time required for such signal processing. The greater the prior reproduction quantity, the larger becomes the difference between the mounting heights of the recording head and the prior reproduction head in the VTR having helical scan recording type with a rotary head cylinder. Considering the VTR for recording wide-band signals such as High Definition TV signals, having a large number of tracks per frame the difference in the mounting heights of the prior reproduction head and recording head is required to be about several millimeters, and each head must be mounted at a precision of several microns or less. If there is an error in head mounting, while the prior reproduction head is on the track to be reproduced, the recording head may be off the track to be recorded, and precise editing cannot be expected.

In a method disclosed in Japanese Laid-Open Patent Application No. 1-152877, the principal information composed of video signal or audio signal is recorded in a state without being faded, and a fade control signal is recorded as the duty of the rotary head phase control signal. In reproduction, the output level is controlled by using the fade control signal. In this method, fade-out and fade-in editing without prior reproduction is possible. However, in order to rewrite the fade control signal, the rotary head phase control signal also must be rewritten. If the timing of the control signal is deviated from its original timing, the tracking varies. Therefore, in order to obtain a stable reproduction image, a signal of the same timing as before rewriting must be recorded at an extremely high precision.

SUMMARY OF THE INVENTION

It is hence a primary object of the invention to present a recording and reproducing apparatus having an editing function accompanied by a change of output level of the video signal or audio signal in a simple constitution without use of a prior reproduction head.

To achieve the above object, the invention presents a recording and reproducing apparatus comprising means for recording an input signal on a recording medium, means for generating additional information data for controlling output levels of a video signal and an audio signal, means for recording the additional information data in an independent area on the recording medium, means for editing the additional information data, means for reproducing the recorded video and audio signals from the recording medium, and means for controlling output levels of the reproduced video signal and audio signal according to the additional information data during reproduction.

In this constitution, by recording the additional information data denoting the individual output levels of the video and audio signals in a different area than the video signal and audio signal recording area, and editing the additional information data, the offset and gain of the output signals can be changed, and fade-out and fade-in editing can be effected not only on the audio signal but also on the video signal, in a simple structure without using a prior reproduction head, thereby realizing an excellent recording and reproducing apparatus.

BRIEF DESCRIPTION OF THE DRAWINGS

FIG. 8 is a conceptual operational diagram showing the operational processing of the video signal data in the second embodiment of the invention.

DESCRIPTION OF THE PREFERRED EMBODIMENTS

Figure 1:
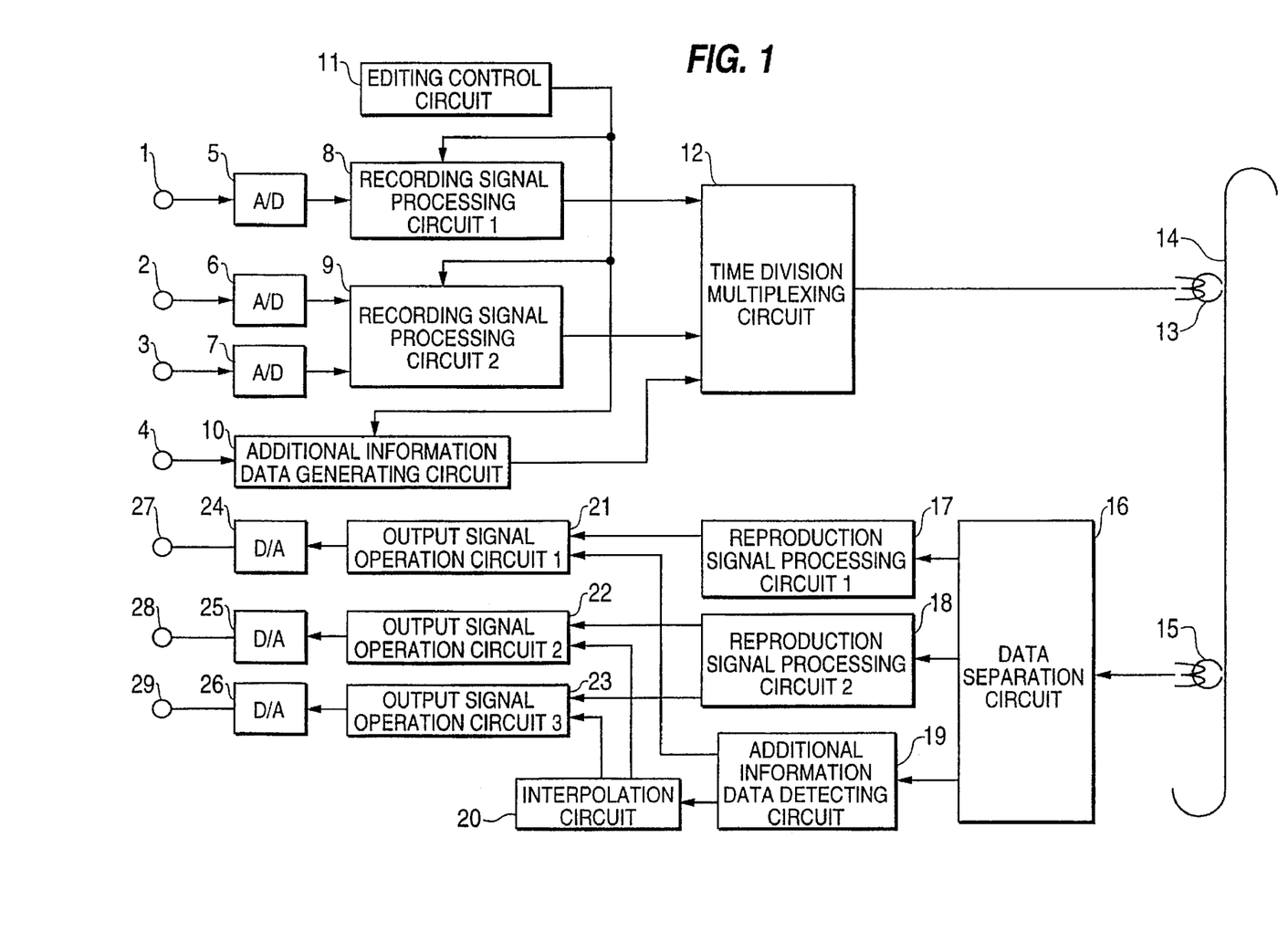
FIG. 1 is a signal processing block diagram of a recording and reproducing apparatus in an embodiment of the invention.
Figure 2:
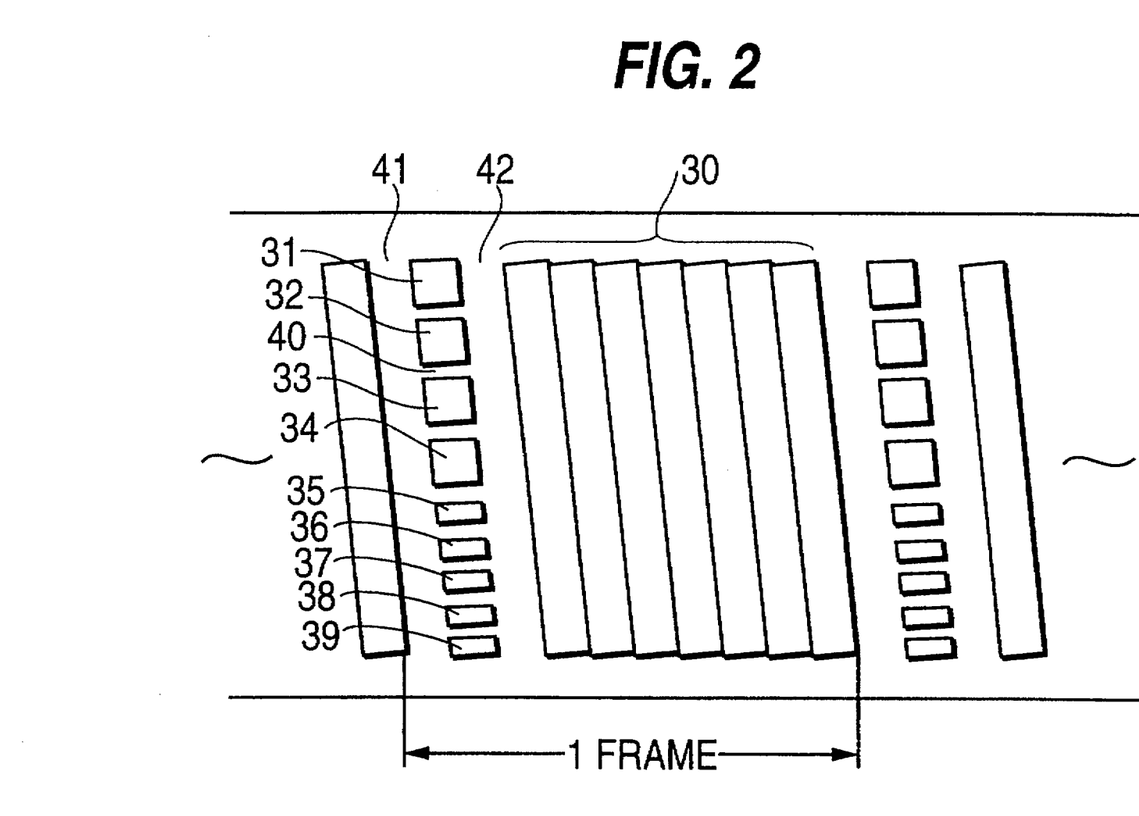
FIG. 2 is a recording track pattern diagram in the embodiment of the invention.
Figure 6:
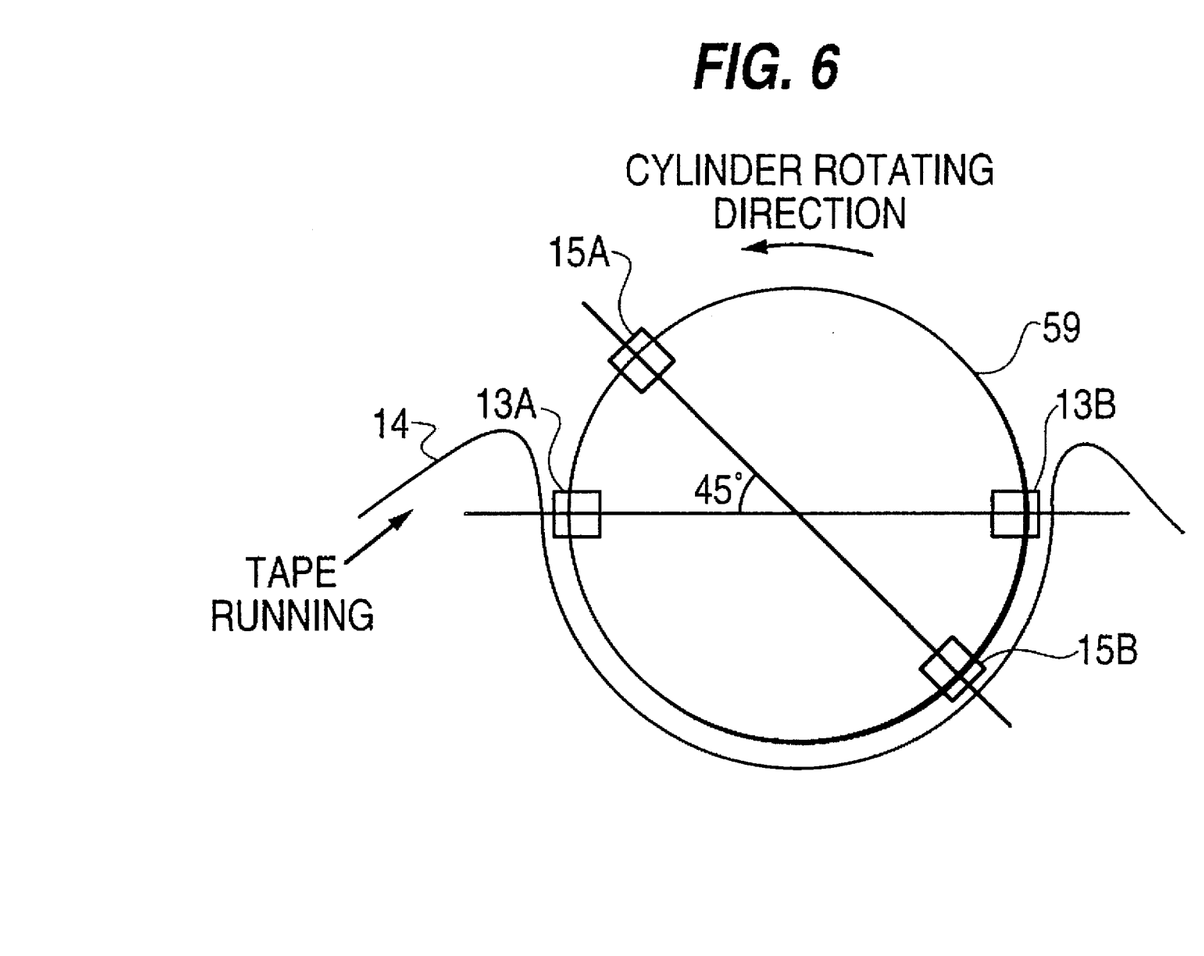
FIG. 6 is a schematic diagram of a top view of a rotary cylinder and head periphery in the embodiment of the invention.

In FIG. 1, numeral 1 denotes an input terminal for receiving a video signal, 2, and 3 are input terminals for receiving two-channel audio signals, 4 is an output level control signal input terminal, 5 is an A/D converter for converting the analog video signal into digital video data, 6 and 7 are A/D converters for converting the two-channel analog audio signals into digital audio data, 8 is a first recording signal processing circuit for converting the digital video data into a recordable signal, 9 is a second recording signal processing circuit for converting the digital audio data into recordable signals, 10 is an additional information data generating circuit for generating output level data indicating output levels of the video signal and audio signals at the time of reproduction, 11 is an editing control circuit, 12 is a time division multiplex circuit for sharing in time and multiplexing the video data, audio data and additional information data, 13 is a recording head, 14 is a recording medium, 15 is a reproduction head, 16 is a data separation circuit for separating the video data, audio data and additional information data from the reproduced signal from head 15, 17 is a first reproduction signal processing circuit for performing reproduction signal processing on the reproduced video data, 18 is a second reproduction signal processing circuit for performing reproduction signal processing on the reproduced audio data, 19 is an additional information data detecting circuit for detecting the output level data from the reproduced additional information data, 20 is an interpolation circuit for Interpolating the audio signals contained in one field from discrete output level data and generating continuous output level data, 21 is a first output signal operation circuit for operating the decoded video data and output level data, 22 and 23 are second and third output signal operation circuits for operating the decoded audio data and output level data, 24 is a D/A converter for converting the digital output video data into an analog video signal, 25 and 28 are D/A converters for converting the individual digital output audio data into analog audio signals, 27 is an output terminal of the reproduced video signal, and 28 and 29 are output terminals of reproduced two-channel audio signals. Here, the output level data is a multiplication factor for the principal information data composed of the video signal and audio signals. In FIG. 2, moreover, numeral 30 denotes a track for recording video signals of one frame, 31 to 34 are tracks for recording audio signals of each channel in each frame in the video signals, 35 is a track for recording the additional information data for the video signal of each frame, 36 to 39 are tracks for recording the additional information data for the audio signals of each frame, and 40 to 42 are tracks in unrecorded state for separating the recording areas of different editing units in the widthwise direction and lengthwise direction of the track. In this embodiment, as shown in FIG. 6, recording heads 13A, 13B are disposed oppositely by 180 degrees on a rotary cylinder 57, and reproduction heads 15A, 15B are mounted at a height, with respect to the recording heads, so as to reproduce the tracks right after recording at a position of −45 degrees to the cylinder rotating direction. As an example, the following description will be made assuming that digital recording is effected by rotating the rotary cylinder at a rotating speed of five times the frame frequency (9000 rpm) (that is, one frame contains 10 recording tracks). The editing unit of video signals is the frame unit, while the editing unit of audio signals is the field unit. For the sake of simplicity of explanation, the recorded video signal is explained only with respect to the luminance signal, and a case of recording the video signal subjected to data compression coding such as, for example, discrete cosine transform (DCT), is explained.

An analog video signal entering from the input terminal 1 is converted into digital video data in the A/D converter 2. The level distribution of this A/D conversion is set, for example, at level 19 for black level and level 125 for white level in the luminance signal, for 8-bit code signals 0 to 255. The color difference signal is A/D converted at level 127 for colorless level. In the first recording signal processing circuit 8, the video data is temporarily stored in a memory in each frame unit, read from the memory sequentially in a predetermined sequence, and is subjected to compression coding and error correction code addition to become coded video data. Similarly, the A/D converted audio signals are subjected to error correction code addition in the second recording signal processing circuit 9 in the field unit of each channel to become coded audio data. Such recording signal processings can be realized by techniques known in the art. In the additional information data generating circuit 10, according to the output level control signal inputted through the input terminal 4, an output level data is produced as the additional information data. This output level data is a multiplication factor indicating a level in each field unit for the video signal, that is, two kinds of multiplication factors for the video signals in one frame, and multiplication factors indicating levels of the first and last samples in one field in each field unit of each of the channel audio signals. The multiplication factor is always 1 in the case of ordinary recording. The coded video data, coded audio data and additional information data are time-division multiplexed at specific time intervals in the time division multiplex circuit 12. The time-division multiplexed data are recorded on the recording medium 14 through the recording head 13 so as to form a recording track pattern as shown in FIG. 2. That is, data recording areas adjacent to each other in the track widthwise direction are separated from each other by an unrecorded track, and data recording areas adjacent to each other in the track lengthwise direction are separated from each other by an unrecorded area having a specific length in the track lengthwise direction.

The reproduction processing is explained below. From the signals reproduced from the recording medium 14 through the reproduction head 15, reproduced coded video data, reproduced coded audio data, and reproduced additional information data are separated in the data separating circuit 16. In the additional information data detecting circuit 19, the output level data, that is, the multiplication factor is detected from the reproduced additional information data.

Figure 3:
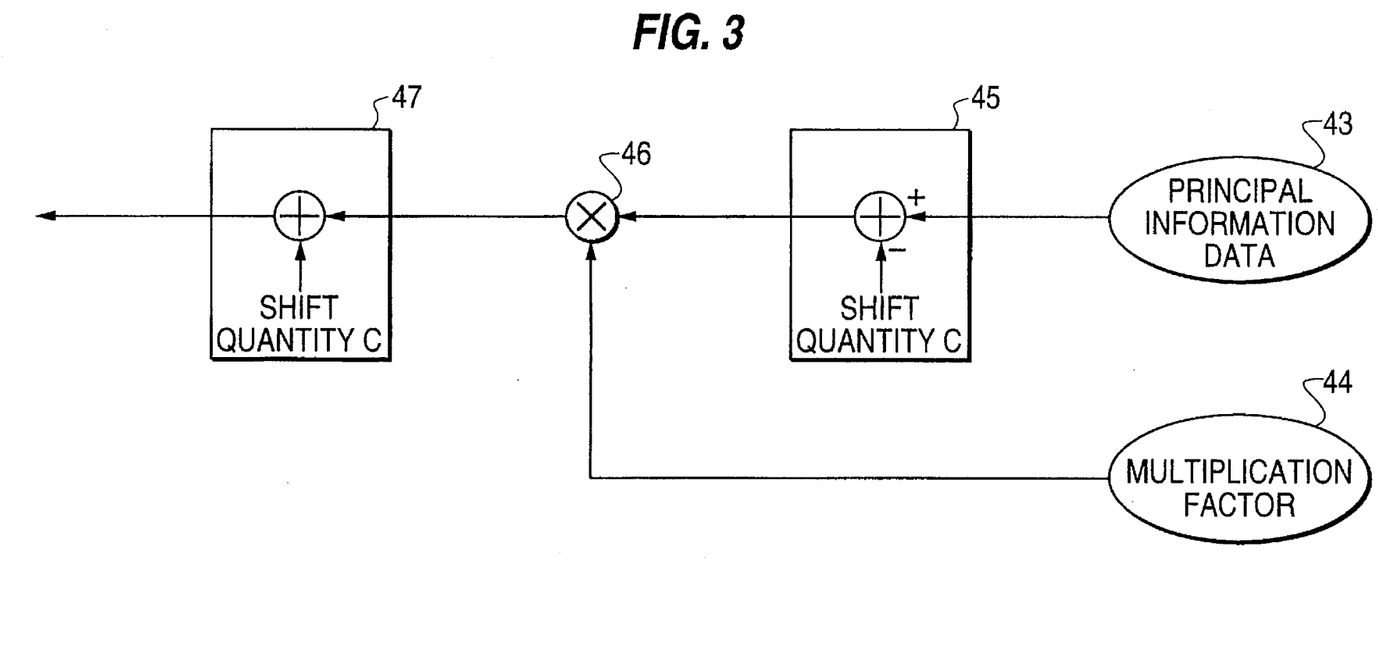

In the first reproduction signal processing circuit 17, the reproduction signal processing including decoding of the reproduced coded video data is performed to obtain a reproduced video data. The reproduced video data is sent into the first output signal operation circuit 21. The output signal operation circuit 21 is composed as shown in FIG. 3. In a level shift circuit 45, the level of the principal information data 43 composed of the reproduced video data is shifted so that the black level, or level 19, may be level 0 for the luminance signal, and that the colorless level, or level 127, may be level 0 for the color difference signal, by subtracting a shift quantity C from the data 43. The level shifted video data and the multiplication factor 44 are multiplied by a multiplier 46, and level-shifted inversely to the abovesaid level shift in an inverse level shift circuit 47 to convert the data into 8-bit data expressed by levels 0 to 255, thereby producing output video signal data.

In the second reproduction signal processing circuit 18, reproduction signal processing is performed on the reproduced coded audio data to obtain decoded audio data. In the interpolation circuit 20, multiplication factors for all samples in one field are interpolated from the multiplication factors for the first and last samples in one field period. The interpolated output level data and the decoded audio data are multiplied in the second and third output signal operation circuits 22, 23 to obtain output audio signal data. Each of the output signal operation circuits 22, 23 is composed also as shown in FIG. 3, wherein prior to the operation processing, the level shift processings before and after the operation are effected on the principal information data 43 composed of the decoded audio data. In this case, the center value of the dynamic range of sound is made 0 so as to be a coded signal with sign before the operation.

Figure 4:
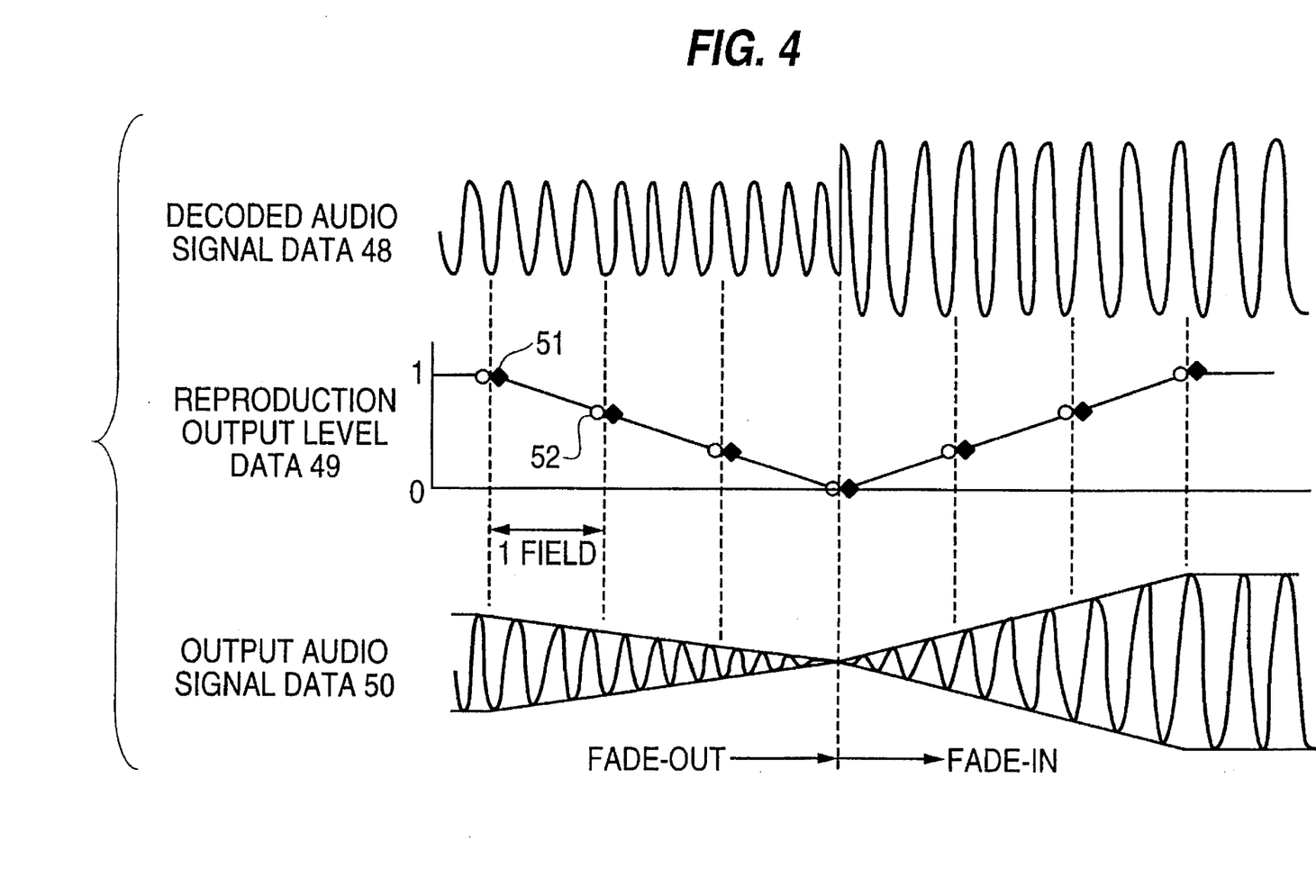
FIG. 4 is a conceptual operational diagram showing the processing of the audio signal data and additional information data at the time of reproduction.

Processing of the audio data and additional information data is shown in FIG. 4. Numeral 48 in FIG. 4 denotes coded audio signal data, 49 is reproduction output level data, 50 is output audio signal data after the operation, 51 is the multiplication factor for the first sample of the field, and 52 is the multiplication factor for the last sample of the field. In numeral 49, in this example, output level data between the first and last data in the field are approximated linearly and interpolated. It is also possible to interpolate with a curve of the higher order. Any other methods of interpolation may be also used. The output video signal data and output audio signal data are converted into analog signals in the D/A converters 27–29.

Figure 5:
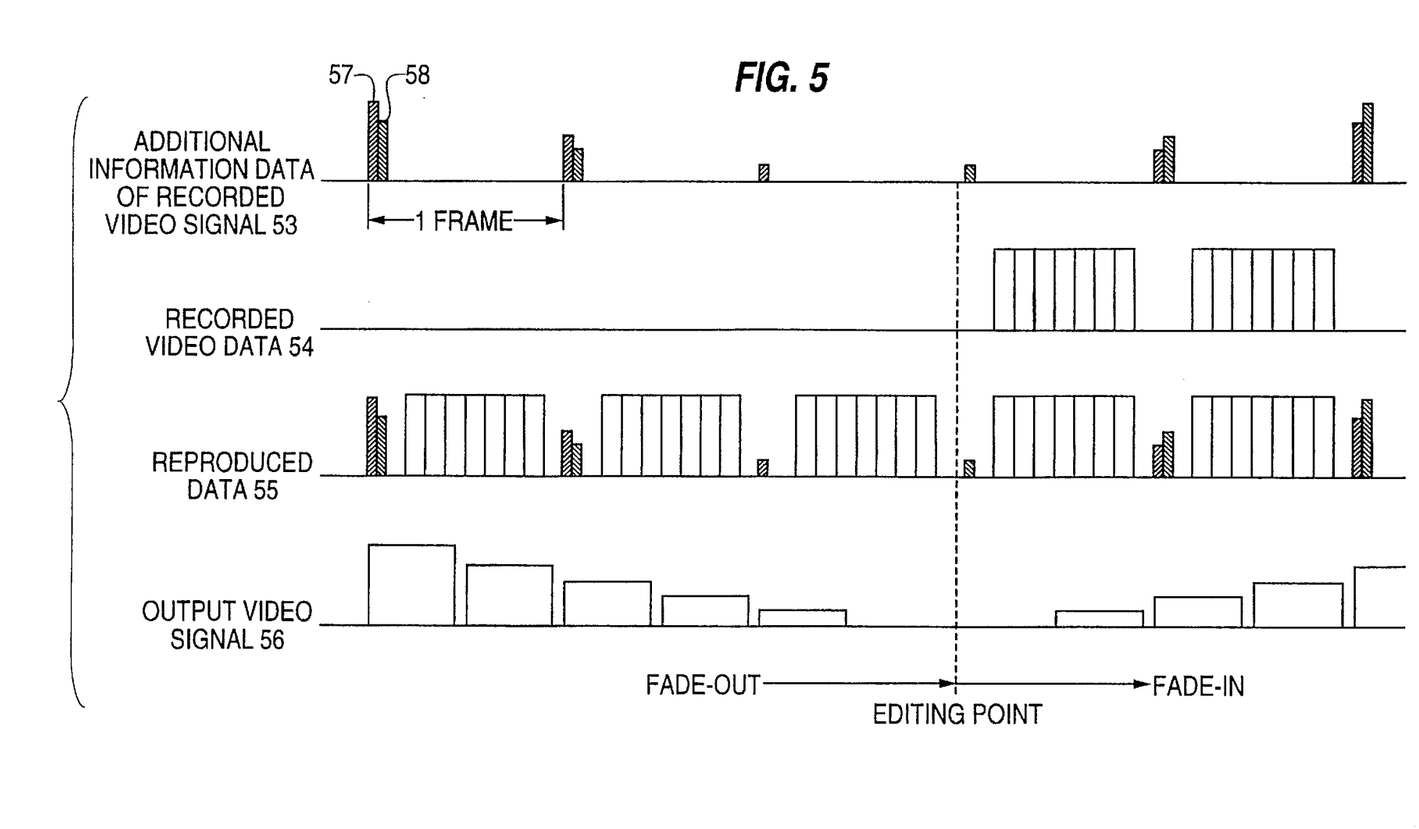
FIG. 5 is a conceptual operation diagram showing the processing at the time of editing.

Explained next is a case of editing by fading out already recorded video signals and fading in input video signals. A conceptual diagram of the operation for processing of fade-out and fade-in editing of video signals is shown In FIG. 5. In FIG. 5, numeral 53 denotes additional information data for the recorded video data, and 54 represents recorded video data. Numeral 55 denotes reproduced data composed of video data and additional information data, 56 is an output video signal obtained by D/A conversion of the output video data obtained by multiplying the reproduced video data by the multiplication factor of the additional information data, 57 is additional information data for the principal information data of the first field, and 58 is additional information data for the principal information data of the second field. Here, numeral 55 does not indicate reproduced audio data and audio additional information data. Numerals 57 and 58 represent the magnitudes of the multiplication factors. In the case of a simple fade-out, as indicated by numeral 53 in FIG. 5, as the time passes in the frame unit from the fade-out start point toward the editing point, the multiplication factors decreasing from 1 to 0 is produced from the additional information data generating circuit 10. By the signal from the editing control circuit 11, the output from the first and second recording signal processing circuits 8 and 9 is prohibited, and only the additional information data is written in the video signal additional information data recording track 35 on the recording medium 14 through the recording head 13. Next, in the case of a simple fade-in on the input video signal, as shown by numeral 53 in FIG. 5, the multiplication factor increasing from 0 to 1 is produced from the additional information data generating circuit 10 as time passes from the editing point in the frame unit, and together with the recorded video data 54 produced from the first recorded signal processing circuit 8, the multiplication factor data is written on the recording medium 14 through the recording head 13. The reproduced data 55 is composed of the rewritten additional information data and the already recorded video data up to the point of editing, and after the editing point, it is composed of the additional information data and newly recorded video data. Depending on the level of the multiplication factor indicated by the additional information level, the level of the output video signal 56 is controlled in each field. In FIG. 5, however, the delay time from the reproduced data to the output is not shown here for the sake of simplicity of explanation.

In the already recorded signal, by rewriting only the additional information data, addition or deletion of the fade-out and fade-In processing is possible using a single VTR unit.

A second embodiment of the invention is explained below. The overall constitution is shown in FIG. 1 and is the same as the first embodiment. The internal structure of the output signal operation circuit 21 in FIG. 1 is shown in FIG. 7, and the operation processing of video signal data is given in FIG. 8.

Figure 7:
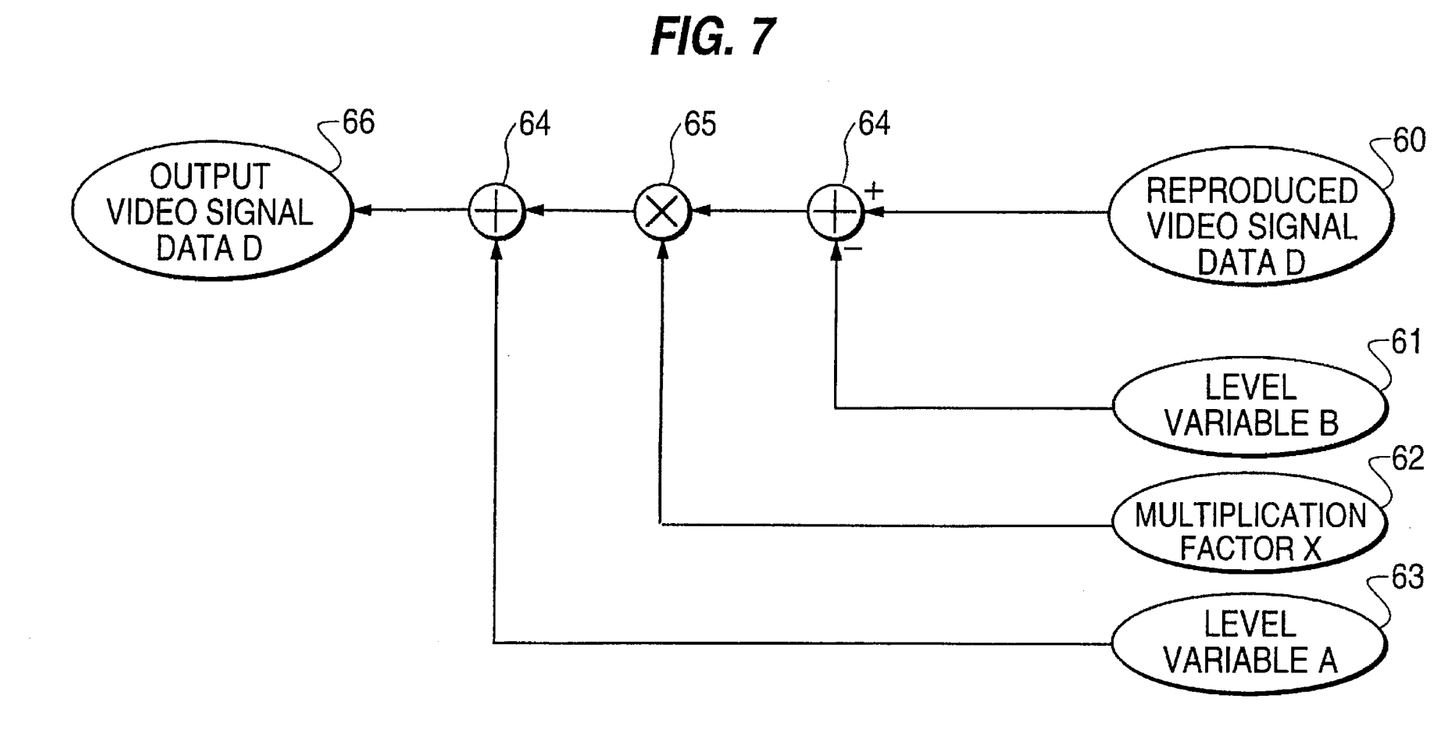
FIG. 7 is a internal structure block diagram of an output signal processing circuit in a second embodiment of the invention.

In FIG. 7, numeral 60 denotes reproduced video signal data D, 61 is level variable B, 62 is multiplication factor X, 63 is level variable A, 64 is an adder, 65 is a multiplier, and 66 is output video signal data d.

In the second embodiment, the additional information data comprises level variables A and B, and multiplication factor X showing the gain for the principal information data. In the first output signal operation circuit 21, the operation of d: $A+(D-B)^*X$ is performed on the principal information data, that is, the reproduced video signal data D to produce the output video signal data d. As a result, various editings are possible depending on the value of the variables given as additional information data. For example, supposing A=B, that is, $d=A+(D-A)^*X$, when X is varied from 0 to 1, fade-out and fade-in on an arbitrary level A as the center may be effected. If A=0, X=1, or d=D–B, the –B level is shifted in the amplitude direction. Supposing the black level to be C, if A=B=C, amplitude processing of X-times is possible around the black level as the center. In this case, by varying X from 0 to 1, the same processing as in the first embodiment is effected.

Figure 8:
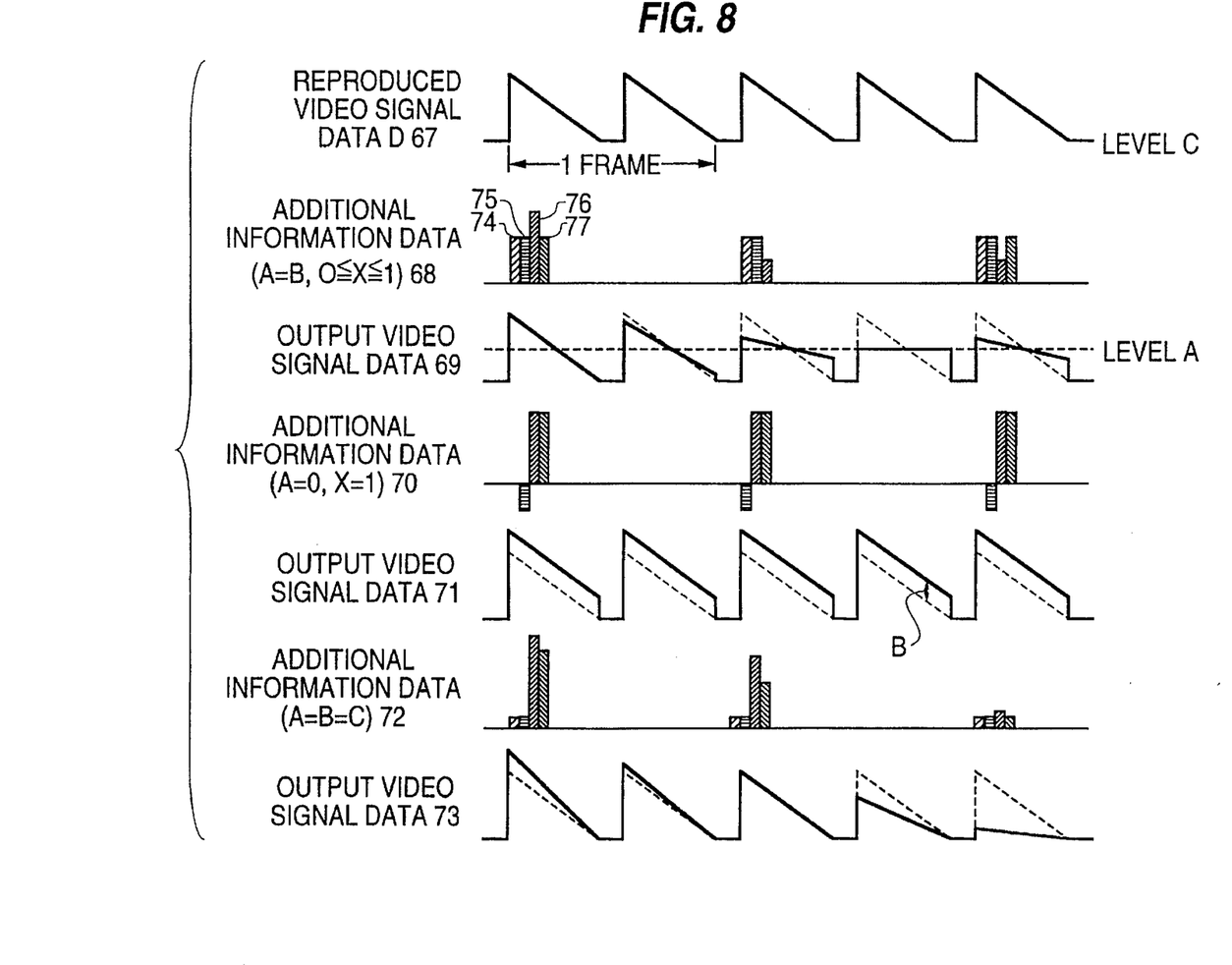
FIG. 8 is a internal structure block diagram of an output signal processing circuit in the recording and reproducing apparatus in the embodiment of the invention.

FIG. 8 is a conceptual operational diagram showing the operation processing of the above three patterns on the reproduced video signal data D. In FIG. 8, numeral 67 denotes reproduced video signal data, 68 and 69 are additional Information data and output video data if A=B, 70 and 71 are additional information data and output video data if A=0, X=1, and 72 and 73 are additional information data and output video data if A=B=C. In the additional information data, 74 represents level variable A, 75 is level variable B, and 76 and 77 are multiplication factors X for the principal information data of the first field and second field, respectively, and the value is indicated as positive in the upward direction and negative in the downward direction.

As explained herein, according to this invention, an area for recording the additional information data for controlling the output level of the video signal or audio signal is disposed in an independent area on the recording medium. By editing this additional information data, the level of the output signal during reproduction can be controlled, and therefore without using the prior reproduction head, the video signal or audio signal can be edited by operation processing in a simple structure.

In the recording track pattern, meanwhile, each of the recording areas of the video signal data, audio signal data and additional information data is isolated from a recording area adjacent thereto in the withwise direction of the recording track by an unrecorded state track. In this way, the individual signal recording areas are made completely independent on the recording medium. Therefore, the editing performance is sufficiently guaranteed even if the precision of track bending or tape feeding is alleviated, and editing of only the principal data or editing of only the additional information data may be carried out even in the VTR of very narrow track width. The number of tracks in unrecorded state disposed between recording tracks is not limited to one, but may be L (L=1, 2, --). In the embodiments, the editing unit of video signal is the frame unit, and the editing unit of audio signal is the field unit. However, the video signal editing unit may be a period of N fields (N=1, 2, 3, ---), and the audio signal editing unit may be a period synchronized with the video signal.

Furthermore, in the embodiments, the level control of the video signal is effected by multiplying the same multiplication factor in each field, but the multiplication factor may be varied within the field. For example, starting from a certain point in the screen, the fade-in and fade-out with various effects may be possible, by setting a gradient in which the coefficient changes from 0 to 1 along the passing of time in the two-dimensional plane of the vertical axis and horizontal axis, and also having a gradient in the direction of the time axis.

The additional information data for the audio signal is, in the embodiments, the multiplication factors for the first and last samples in one field, that is, the editing period of the audio signal. However, the recording and reproducing apparatus of the invention may be realized in the same constitution also by using only the last sample or using the data showing the output level at the representative point of several samples.

The invention, needless to say, is effective in the case where compression coding is not performed or in the case of an analog recording system, although it is particularly effective in the case of digital recording by compression coding as shown in the embodiments from the viewpoint of simplification of the circuit. Such effects are not limited to the VTR using the rotary head cylinder but may also be realized in other recording and reproducing apparatus using, for example, an optical disk.

What is claimed is:

1. A recording and reproducing apparatus comprising:
   means for recording input video and audio signals in video and audio recording areas on a recording medium;
   means for generating additional information data containing a multiplication factor for specifying an output level of reproduced video and audio signals;
   means for recording the additional information data in an independent area separated from the video and audio recording areas on the recording medium;
   means for reproducing the recorded video and audio signals and the recorded additional information data from the recording medium to obtain the reproduced video and audio signals and a reproduced additional information data;
   means for detecting the multiplication factor contained in the recorded additional information data; and
   means for multiplying the reproduced video and audio signals by the multiplication factor detected by said means for detecting to thereby control an output level of the reproduced video and audio signals;
   wherein the additional information data for the video signal comprises first level variable A indicating a first shift of the video signal, second level variable B indicating a second shift of the video signal which corresponds to black level or colorless level, and multiplication factor X indicating a gain of the video signal, and in level control of an output video signal in reproduction, an output video signal data d is obtained by operation of $d=A+(D-B)^*X$ for a reproduced video signal data D.

* * * * *